United States Patent
Lin et al.

(10) Patent No.: US 11,467,479 B2
(45) Date of Patent: Oct. 11, 2022

(54) POLARIZING ROTATION DEVICE AND PROJECTION DEVICE

(71) Applicant: Coretronic Corporation, Hsin-Chu (TW)

(72) Inventors: Yao-Shun Lin, Hsin-Chu (TW); Chi-Tang Hsieh, Hsin-Chu (TW); Chih-Hsien Tsai, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/568,298

(22) Filed: Sep. 12, 2019

(65) Prior Publication Data
US 2020/0089095 A1      Mar. 19, 2020

(30) Foreign Application Priority Data

Sep. 17, 2018   (CN) .......................... 201811080242.0
Apr. 25, 2019   (CN) .......................... 201910338637.4

(51) Int. Cl.
G03B 21/20      (2006.01)
G02B 27/28      (2006.01)
(Continued)

(52) U.S. Cl.
CPC ......... *G03B 21/2073* (2013.01); *G02B 27/28* (2013.01); *G02B 30/25* (2020.01);
(Continued)

(58) Field of Classification Search
CPC .. G03B 21/20; G03B 21/2073; G03B 21/208; G03B 21/2013; G03B 21/2033;
(Continued)

(56) References Cited

U.S. PATENT DOCUMENTS 5,517,340 A * 5/1996 Doany ................. G02B 27/283
                                                        348/742
9,645,423 B2 * 5/2017 Seo .................... G02F 1/133308
(Continued)

FOREIGN PATENT DOCUMENTS

CN      1559013        12/2004
CN      1928701         3/2007
(Continued)

OTHER PUBLICATIONS

"Office Action of China Counterpart Application", dated Feb. 2, 2021, p. 1-p. 16.
(Continued)

*Primary Examiner* — Magda Cruz
(74) *Attorney, Agent, or Firm* — JCIPRNET

(57) ABSTRACT

A polarizing rotation device including a rotation shaft, a driving element and a polarizing element is provided. The driving element is configured to drive the rotation shaft to rotate. The polarizing element is connected to the rotation shaft and is disposed on a transmission path of at least one beam, where the driving element is configured to drive the polarizing element to rotate sequentially while taking the rotation shaft as a rotation central axis, and when the polarizing element is rotated, the at least one beam penetrates through the polarizing element, and the at least one beam penetrating through the polarizing element has different polarization states at different time. Therefore, when a projection device is in a polarized stereoscopic mode, a color or brightness of a display image is uniform, and a user observes a 3D display image with good uniformity.

25 Claims, 9 Drawing Sheets

(51) Int. Cl.
*G03B 33/10* (2006.01)
*G02B 30/25* (2020.01)

(52) U.S. Cl.
CPC ......... *G03B 21/20* (2013.01); *G03B 21/2013* (2013.01); *G03B 21/2033* (2013.01); *G03B 21/2066* (2013.01); *G03B 33/10* (2013.01)

(58) Field of Classification Search
CPC .... G03B 21/2066; G03B 33/10; G02B 30/25; G02B 27/28; G02B 5/20; G02B 5/30; G02B 27/281; G02B 27/288; G02B 26/008
See application file for complete search history.

(56) References Cited

U.S. PATENT DOCUMENTS

| | | | |
|---|---|---|---|
| 9,716,869 B2 | 7/2017 | Nakajima et al. | |
| 10,824,067 B2* | 11/2020 | Pan | G03B 21/208 |
| 2005/0041163 A1* | 2/2005 | Butler-Smith | H04N 13/363 348/744 |
| 2005/0134808 A1* | 6/2005 | Pettitt | G02B 26/008 353/84 |
| 2007/0139619 A1* | 6/2007 | DeCusatis | H04N 13/398 353/7 |
| 2008/0239067 A1* | 10/2008 | Lipton | H04N 13/334 348/54 |
| 2008/0304015 A1 | 12/2008 | Chen et al. | |
| 2010/0026934 A1* | 2/2010 | Sun | G02F 1/133606 349/194 |
| 2012/0236263 A1 | 9/2012 | Murakawa et al. | |
| 2013/0088471 A1 | 4/2013 | Kitano | |
| 2013/0188157 A1 | 7/2013 | DeCusatis | |
| 2016/0069558 A1* | 3/2016 | Hu | G02F 1/1336 362/84 |
| 2016/0119595 A1 | 4/2016 | Lyubarsky et al. | |
| 2017/0115500 A1* | 4/2017 | Tian | G02B 5/0278 |
| 2018/0199013 A1* | 7/2018 | Wu | G03B 21/2053 |
| 2019/0041739 A1* | 2/2019 | Kamijima | G03B 21/208 |
| 2019/0072840 A1* | 3/2019 | Tanaka | G03B 21/2066 |
| 2019/0129290 A1* | 5/2019 | Tian | G02B 26/008 |
| 2019/0391473 A1* | 12/2019 | Uchiyama | G03B 21/2073 |

FOREIGN PATENT DOCUMENTS

| | | |
|---|---|---|
| CN | 1987552 | 6/2007 |
| CN | 101126889 | 2/2008 |
| CN | 101738737 | 6/2010 |
| CN | 102460270 | 5/2012 |
| CN | 102763026 | 10/2012 |
| CN | 103718085 | 4/2014 |
| CN | 104064118 | 9/2014 |
| CN | 104483758 | 4/2015 |
| CN | 204496929 | 7/2015 |
| CN | 105022214 | 11/2015 |
| CN | 105093795 | 11/2015 |
| CN | 105116675 | 12/2015 |
| CN | 105137610 | 12/2015 |
| CN | 105425521 | 3/2016 |
| CN | 106707672 | 5/2017 |
| CN | 106716248 | 5/2017 |
| CN | 106896520 | 6/2017 |
| CN | 106950617 | 7/2017 |
| CN | 206321933 | 7/2017 |
| CN | 107667313 | 2/2018 |
| CN | 108254909 | 7/2018 |
| CN | 108398804 | 8/2018 |
| CN | 209765253 | 12/2019 |
| EP | 2990722 | 3/2016 |
| JP | 2001296503 | 10/2001 |
| TW | 460723 | 10/2001 |
| TW | I380125 | 12/2012 |

OTHER PUBLICATIONS

"Office Action of China Counterpart Application", dated Sep. 18, 2021, p. 1-p. 19.

* cited by examiner

POLARIZING ROTATION DEVICE AND PROJECTION DEVICE

CROSS-REFERENCE TO RELATED APPLICATION

This application claims the priority benefit of China application serial no. 201811080242.0, filed on Sep. 17, 2018, and China application serial no. 201910338637.4, filed on Apr. 25, 2019. The entirety of each of the above-mentioned patent applications is hereby incorporated by reference herein and made a part of this specification.

BACKGROUND OF THE INVENTION

Field of the Invention

The invention relates to a rotation device and an optical device, and particularly relates to a polarizing rotation device and a projection device.

Description of Related Art

Projection device is a kind of display device used for producing large-scale images. Along with development and innovation of science and technology, the projection device has been constantly improved. An imaging principle of the projection device is to convert an illumination beam generated by an illumination system into an image beam by using a light valve, and then project the image beam onto a projection target (for example, a screen or a wall) by using a projection lens, so as to form a projected image.

Moreover, the illumination system has evolved from Ultra-High-Performance lamp (UHP lamp) and Light-Emitting Diode (LED) to the most advanced Laser Diode (LD) light source along with market requirements on projectors for brightness, color saturation, service life, non-toxic and environmental protection. However, in the illumination system, a cost-effective way of producing red and green light at present is to use a blue laser diode to emit an excitation beam to irradiate a phosphor wheel, and the excitation beam excites a phosphor powder on the phosphor wheel to produce yellow-green light. Then, a filter wheel is adopted to obtain the required red light or green light for usage.

However, in a known illumination system framework, polarization polarity of the excitation beam entering the projection device is destroyed by optical elements inside the projection device, so that a polarization direction and intensity of the laser beam become divergent, which causes a problem of nonuniform brightness of a display image. Therefore, if the projection device produces a 3D display image in a polarized stereoscopic mode (a polarizer is added to the outside of the projection lens), the image projected from the projection lens and the polarizer may have a phenomenon of nonuniform color or nonuniform brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a polarizing rotation device and a projection device, and in a polarized stereoscopic mode of the projection device, a color or brightness of a display image is uniform, so that a user may observe a three-dimensional (3D) display image with good uniformity.

Other objects and advantages of the invention may be further illustrated by the technical features broadly embodied and described as follows.

In order to achieve one or a portion of or all of the objects or other objects, an embodiment of the invention provides a polarizing rotation device including a rotation shaft, a driving element and a polarizing element. The driving element is configured to drive the rotation shaft to rotate. The polarizing element is connected to the rotation shaft and is disposed on a transmission path of at least one excitation beam, where the driving element is configured to drive the polarizing element to rotate sequentially while taking the rotation shaft as a rotation central axis, and when the polarizing element is rotated, the at least one excitation beam penetrates through the polarizing element, and the at least one excitation beam penetrating through the polarizing element has different polarization states at different time.

In order to achieve one or a portion of or all of the objects or other objects, an embodiment of the invention provides a projection device including an illumination system, at least one light valve and a projection lens. The illumination system is configured to provide an illumination beam. The illumination system includes at least one excitation light source, a polarizing rotation device and a light uniforming element. The at least one excitation light source is configured to provide at least one excitation beam. The polarizing rotation device includes a rotation shaft, a driving element and a polarizing element. The driving element is configured to drive the rotation shaft to rotate. The polarizing element is connected to the rotation shaft and is disposed on a transmission path of the at least one excitation beam. The light uniforming element is pervious to a part of the at least one excitation beam to form the illumination beam. The at least one light valve is disposed on a transmission path of the illumination beam, and is configured to convert the illumination beam into an image beam. The projection lens is disposed on a transmission path of the image beam, and is configured to convert the image beam into a projection beam, where the driving element is configured to drive the polarizing element to rotate sequentially while taking the rotation shaft as a rotation central axis. When the polarizing element is rotated, the at least one excitation beam penetrates through the polarizing element, and the at least one excitation beam penetrating through the polarizing element has different polarization states at different time.

In order to achieve one or a portion of or all of the objects or other objects, an embodiment of the invention provides a projection device including an illumination system, at least one light valve and a projection lens. The illumination system is configured to provide an illumination beam. The illumination system includes a light source, a polarizing rotation device and a light uniforming element. The light source includes at least one excitation light source and at least one auxiliary light source, the at least one excitation light source is configured to provide at least one excitation beam, and the at least one auxiliary light source is configured to provide at least one auxiliary beam. The polarizing rotation device includes a rotation shaft, a driving element and a polarizing element. The driving element is configured to drive the rotation shaft to rotate. The polarizing element is connected to the rotation shaft and is disposed on a transmission path of the at least one auxiliary beam. The light uniforming element is pervious to a part of the at least one excitation beam and the at least one auxiliary beam to form the illumination beam. The at least one light valve is disposed on a transmission path of the illumination beam, and is configured to convert the illumination beam into an image beam. The projection lens is disposed on a transmission path of the image beam, and is configured to convert the image beam into a projection beam, where the driving element is configured to drive the polarizing element to rotatesequentially while taking the rotation shaft as a rotation central axis. When the polarizing element is rotated, the at least one auxiliary beam penetrates through the polarizing element, and the at least one auxiliary beam penetrating through the polarizing element has different polarization states at different time.

In order to achieve one or a portion of or all of the objects or other objects, an embodiment of the invention provides a projection device including an illumination system, at least one light valve and a projection lens. The illumination system is configured to provide an illumination beam. The illumination system includes at least two light sources and a polarizing rotation device. The at least two light sources are configured to provide at least two beams. The polarizing rotation device includes a rotation shaft, a driving element and a polarizing element. The driving element is configured to drive the rotation shaft to rotate. The polarizing element is connected to the rotation shaft and is disposed on a transmission path of the at least two beams. The at least one light valve is disposed on a transmission path of the illumination beam, and is configured to convert the illumination beam into an image beam. The projection lens is disposed on a transmission path of the image beam, and is configured to convert the image beam into a projection beam, where the driving element is configured to drive the polarizing element to rotate sequentially while taking the rotation shaft as a rotation central axis. When the polarizing element is rotated, the at least two beams penetrate through the polarizing element, the at least two beams penetrating through the polarizing element have different polarization states at different time, and the at least two beams penetrating through the polarizing element form the illumination beam.

Based on the above description, the embodiments of the invention have at least one of the following advantages or effects. In the polarizing rotation device or the projection device configured with the polarizing rotation device of the invention, the driving element is configured to drive the polarizing element to rotate timingly while taking the rotation shaft as the rotation central axis. Therefore, the beam may penetrate through the polarizing element, and the beam penetrating through the polarizing element has different polarization states at different time. In this way, in a polarized stereoscopic mode (a polarizer is added to the outside of the projection lens) of the projection device, a color or brightness of a display image is uniform, so that a user may observe a 3D display image with better uniformity through polarized stereoscopic glasses.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
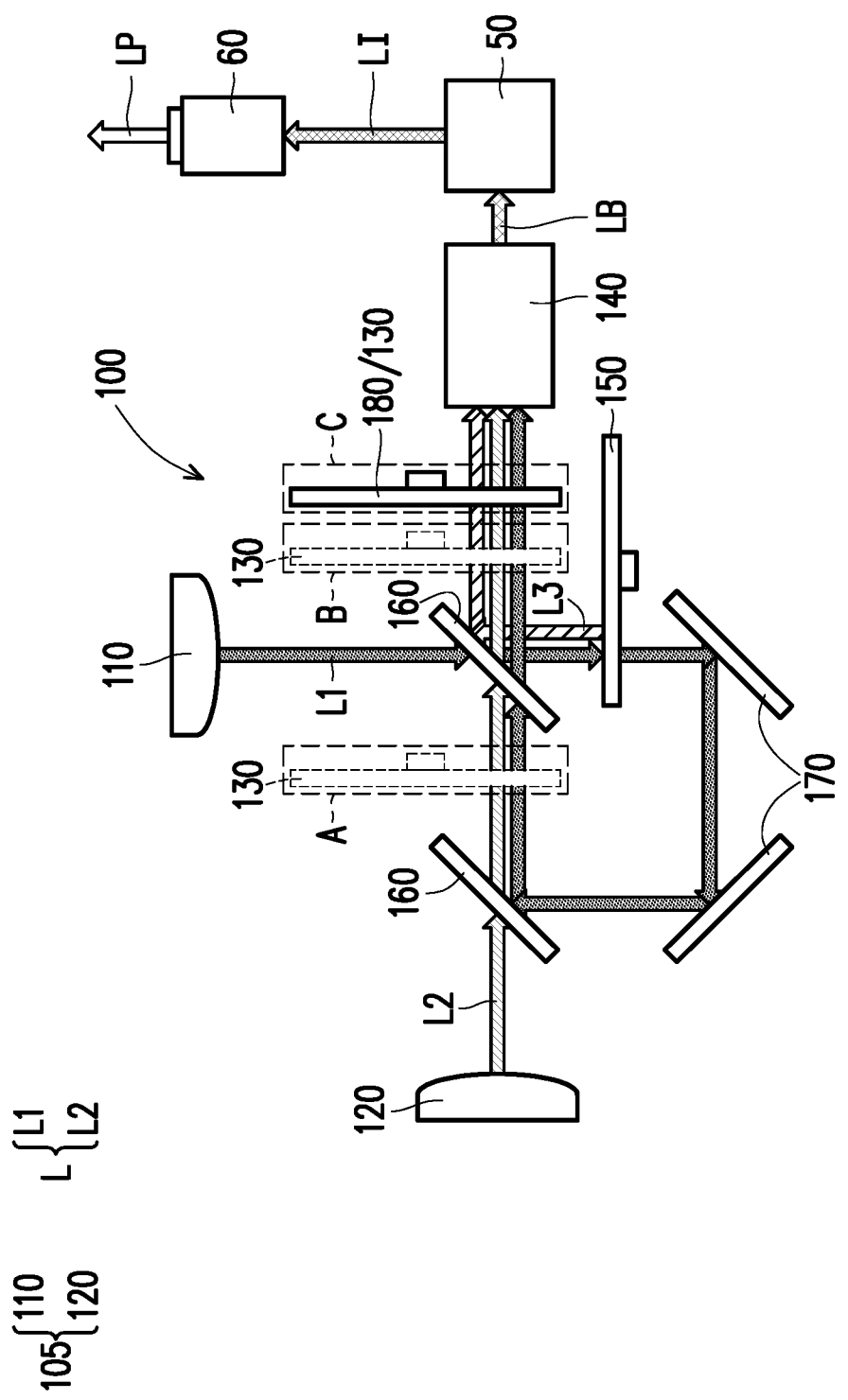
FIG. 1 is a schematic diagram of a projection device according to an embodiment of the invention.

FIG. 1 is a schematic diagram of a projection device according to an embodiment of the invention. Referring to FIG. 1, in the embodiment, a projection device 10 is configured to provide a projection beam LP. To be specific, the projection device 10 includes an illumination system 100, at least one light valve 50 and a projection lens 60, and the illumination system 100 is configured to provide an illumination beam LB. The light valve 50 is disposed on a transmission path of the illumination beam LB, and is configured to convert the illumination beam LB into an image beam L1. The so-called illumination beam LB refers to a light beam provided to the light valve 50 by the illumination system 100 at any time. The projection lens 60 is disposed on a transmission path of the image beam L1, and is configured to convert the image beam L1 into the projection beam LP, and the projection beam LP is projected to a projection target (not shown), for example, a screen or a wall.

In case of the 3D display technique, the projection device 10 of the embodiment may be implemented as a polarized stereoscopic image projector. To be specific, in a polarized stereoscopic mode (i.e. a polarizer is configured outside the projection lens 60 or configured inside the projection device 10) of two projection devices 10, the projection beams LP provided by the two projection devices 10 respectively pass through the corresponding polarizers, and image frames generated from the two projection devices have different polarization states, such that a user wearing polarized stereoscopic glasses may observe a 3D display image, for example, the stereoscopic glasses worn by the user are respectively configured with two polarizing elements for left eyeglass and right eyeglass, and the two polarizing elements correspond to the image frames with the polarization states produced by the polarizers of the projection devices, such that the left and right eyes of the user may respectively receive the image frames projected by the corresponding projectors, so as to achieve a 3D display effect.

To be specific, in the embodiment, the light valve 50 is, for example, a reflective light modulator such as a Liquid Crystal on Silicon panel (LCoS panel), a Digital Micro-Mirror Device (DMD), etc. In some embodiments, the light valve 50 may also be a transmissive light modulator such as a Transparent Liquid Crystal Panel, an Electro-Optical Modulator, a Magneto-Optic modulator, an Acousto-Optic Modulator (AOM), etc. The pattern and type of the light valve 50 are not limited by the invention. Those skilled in the art may learn enough instructions and recommendations for detailed steps of the method for converting the illumination beam LB into the image beam L1 by the light valve 50 and implementation thereof from ordinary knowledge of the related technical field, and details thereof are not repeated. In the embodiment, the number of the light valve 50 is one. For example, the projection device 10 uses a single Digital Micro-Mirror Device (1-DMD), though the number of the light valve 50 may be plural in other embodiments, which is not limited by the invention.

The projection lens 60 is, for example, a combination of one or a plurality of optical lenses with refractive powers, which is, for example, a combination of non-planar lenses including a biconcave lens, a lenticular lens, a concavo-convex lens, a convexo-concave lens, a plano-convex lens, a plano-concave lens, etc. In an embodiment, the projection lens 60 may also include a planar optical lens for projecting the image beam L1 coming from the light valve 50 to the projection target in a reflective or transmissive manner. The pattern and type of the projection lens 60 are not limited by the invention.

Moreover, in some embodiments, the projection device 10 may selectively include optical elements with a light converging function, a refraction function or a reflection function, which is configured to guide the illumination beam LB emitted by the illumination system 100 to the light valve 50, and configured to guide the image beam L1 generated by the light valve 50 to the projection lens 60, so as to generate the projection beam LP, though the invention is not limited thereto.

The illumination system 100 includes at least one light source 105, a polarizing rotation device 130 and a light uniforming element 140. To be specific, in the embodiment, the projection device 10 uses 1-DMD, and the illumination system 100 further includes a wavelength conversion element 150, at least one dichroic element 160, at least one reflection element 170 and a filter device 180. The polarizing rotation device 130 is selectively disposed at one of a position A, a position B and a position C in the illumination system 100, as that shown in FIG. 1, though the invention is not limited thereto.

In other embodiments, the number of the light valve 50 may be two. For example, a projection device uses two DMDs (2-DMD), and the illumination system 100 may have no filter device 180. The polarizing rotation device 130 is selectively disposed at one of the position A and the position B in the illumination system 100, as shown in FIG. 1, though the invention is not limited thereto.

The light source 105 is configured to provide at least one beam L. To be specific, the light source 105 includes an excitation light source 110 and an auxiliary light source 120, where the excitation light source 110 provides an excitation beam L1, and the auxiliary light source 120 provides an auxiliary beam L2. In the embodiment, the excitation light source 110 may be a laser diode (LD) or a plurality of laser diodes adapted to emit blue laser light, and the auxiliary light source 120 may be a laser diode or a plurality of laser diodes adapted to emit red laser light or a Light-Emitting Diode (LED) or a plurality of LEDs adapted to emit red light. In other words, in the embodiment, the light sources 105 are all laser light-emitting devices.

The wavelength conversion element 150 is disposed on a transmission path of the excitation beam L1, and is located between the excitation light source 110 and the light uniforming element 140. The wavelength conversion element 150 has a wavelength conversion material to convert the excitation beam L1 into an excited beam L3. In the embodiment, the wavelength conversion element 150, for example, converts the blue excitation beam into a green excited beam or a yellow excited beam or a yellow-green excited beam. In different embodiments, configuration of the wavelength conversion material of the wavelength conversion element 150 may be varied along with different types of the illumination system 100, and the configuration pattern and the type of the wavelength conversion element 150 are not limited by the invention.

The at least one dichroic element 160 is disposed on a transmission path of the excitation beam L1 or the auxiliary beam L2, and the at least one reflection element 170 is configured to reflect or transmit the above beam. For example, in the embodiment, the at least one dichroic element 160 includes a Dichroic Mirror with Blue light reflect (DMB) and a Dichroic Mirror with Green and Orange light reflect (DMGO), where the DMB (the dichroic element 160) is located between the auxiliary light source 120 and the DMGO (the dichroic element 160) and is configured to reflect the excitation beam L1 and is pervious to the auxiliary beam L2. The DMGO (the dichroic element 160) is located between the filter device 180 and the DMB (another dichroic element 160), and is configured to reflect the excited beam L3 and is pervious to the excitation beam L1, and the auxiliary beam L2, such that all of the required beams are converged and transmitted to the filter device 180.

In a different embodiment, the configurations and the types of the dichroic element 160 and the reflection element 170 may be varied along with different types of the illumination system 100, and the configuration patterns and the types of the dichroic element 160 and the reflection element 170 are not limited by the invention.

The filter device 180 is disposed between the excitation light source 110 and the light uniforming element 140, which has filters of different colors to let the excitation beam L1, the auxiliary beam L2 and the excited beam L3 pass through to correspondingly generate a blue light part, a red light part and a green light part of the illumination beam LB. To be specific, in the embodiment, the filter device 180 may be a rotatable color filter wheel device, which is used for providing a filter effect to the excitation beam L1, the auxiliary beam L2 and the excited beam L3 based on timing, so as to increase color purity of a light beam passing through the filter device 180. In a different embodiment, configuration of the filters of different colors in the filter device 180 may be varied along with different types of the illumination system 100, and the configuration pattern and the type of the filter device 180 are not limited by the invention. In addition, in some embodiments, the light source 105 may have no auxiliary light source 120, and the red light part of the illumination beam LB may be provided from a red light band of the excited beam L3.

The light uniforming element 140 is pervious to a part of the at least one excitation beam L1 to form the illumination beam LB. Namely, the light uniforming element 140 is disposed on a transmission path of the excitation beam L1, the auxiliary beam L2 and the excited beam L3 to adjust a shape of a light spot of the above beams, such that the shape of the light spot of the illumination beam LB emitted from the light uniforming element 140 matches to a shape (for example, a rectangle) of a working area of the light valve 50, and the light spot has a uniform light intensity or all points of the light spot has close light intensity. In the embodiment, the light uniforming element 140 is, for example, an integration rod, though in other embodiments, the light uniforming element 140 may also be other suitable type of optical element, which is not limited by the invention.

Figure 2A:
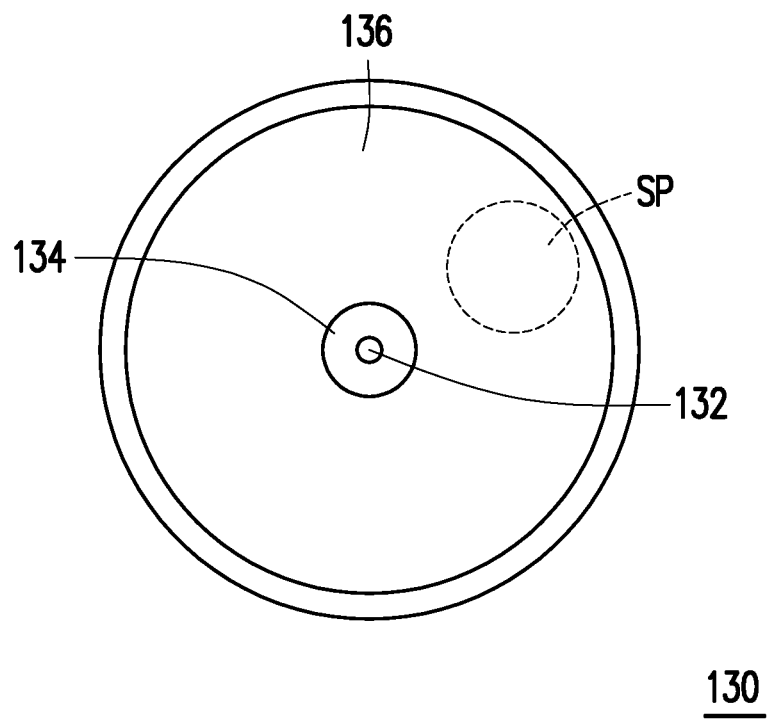
FIG. 2A to FIG. 2D are schematic diagrams of polarizing rotation devices according to different embodiments of the invention.

FIG. 2A to FIG. 2D are schematic diagrams of polarizing rotation devices according to different embodiments of the invention. FIG. 2E and FIG. 2F are schematic side views of polarizing rotation devices combined with a filter device according to different embodiments of the invention. Referring first to FIG. 1 and FIG. 2A, the polarizing rotation device 130 may be a rotatable wheel device, which is configured to change polarization directions and intensity of the excitation beam L1, the auxiliary beam L2 or the excited beam L3 based on a time sequence. In detail, the polarizing rotation device 130 includes a rotation shaft 132, a driving element 134 and a polarizing element 136. The polarizing element 136 is disposed on the transmission path of the excitation beam L1. The polarizing element 136 is connected to the rotation shaft 132, and the driving element 134 is configured to drive the rotation shaft 132 to rotate, so as to drive the polarizing element 136 to rotate sequentially while taking the rotation shaft 132 as a rotation central axis. In the embodiment, the driving element 134 is, for example, a motor, which is configured at a center portion of the polarizing element 136 to connect the rotation shaft 132, though the invention is not limited thereto. In other words, in the embodiment, the excitation beam L1 is incident on a non-center portion of the polarizing element 136 to form a light spot SP, and then the excitation beam L1 passes through the non-center portion of the polarizing element 136.

The polarizing element 136 may be a one-half wave plate, a quarter wave plate, a depolarizing plate, a circular polarizing plate or a combination of the quarter wave plate and the circular polarizing plate. Since the excitation beam L1 is polarized light (linearly polarized), after the excitation beam L1 passes through the polarizing element 136, a polarization state of the excitation beam L1 is changed due to the type of the polarizing element 136. Therefore, when the polarizing element 136 is rotated, the excitation beam L1 penetrates through the polarizing element 136, and the excitation beam L1 penetrating through the polarizing element 136 has a different polarization state at different time. In other words, when the illumination system 100 operates, the excitation beam L1 is quickly and continuously switched to have different polarization directions and light intensities based on rotation of the polarizing rotation device 130.

Since the excitation beam L1 of different polarization directions may be manipulated within a range that cannot be perceived by human eyes due to a rotation speed of the polarizing rotation device 130, the human eyes may perceive an image with a uniform intensity and no specific polarization direction. For example, the rotation speed of the polarizing rotation device 130 may be greater than or equal to 1800 rpm, and is, for example, 1800 rpm, 3600 rpm or 7200 rpm, though the invention is not limited thereto. In this way, when two projection devices 10 are in the polarized stereoscopic mode (i.e. a polarizer is configured outside the projection lens 60 or configured inside the projection device 10), after the light beams passing through the polarizing rotation devices 130 in the two projection devices 10 sequentially penetrate through the projection lenses 60 and the polarizers, the light beams may produce an image frame with a uniform color and brightness on the screen, such that the user may observe a 3D display image with good uniformity through the polarized stereoscopic glasses.

It should be noted that the polarizing rotation device 130 may be selectively disposed at a plurality of different positions in the illumination system 100 or the projection device 10. In detail, the polarizing rotation device 130 may be disposed between the auxiliary light source 120 and the wavelength conversion element 150, for example, at a position A shown in FIG. 1. In this way, the excitation beam L1 passing thought the wavelength conversion element 150 and the auxiliary beam L2 emitted by the auxiliary light source 120 may pass through the polarizing rotation device 130, such that the polarization states of the excitation beam L1 and the auxiliary beam L2 are uniform in timing, so as to achieve a good display effect. In addition, the polarizing rotation device 130 may not be disposed on a transmission path of the excited beam L3, such that the excited beam L3 does not pass through the polarizing element 136 and avoids loss of brightness, and better light efficiency can be achieved. However, in different embodiments, the polarizing rotation device 130 may also be disposed between the wavelength conversion element 150 and the filter device 180, for example, at the position B shown in FIG. 1, so as to let the excitation beam L1, the auxiliary beam L2 and the excited beam L3 pass through, though the invention is not limited thereto.

In another embodiment, the polarizing rotation device 130 may further include a filter element (for example, a filter element FE shown in FIG. 2E and FIG. 2F, which will be described later in detail), where configuration positions of the filter element and the polarizing element 136 are coincided, i.e. the polarizing rotation device 130 is disposed on the filter element. In other words, the polarizing rotation device 130 of the embodiment of FIG. 1 is combined with the filter device 180 at, for example, the position C shown in FIG. 1. Therefore, when the excitation beam L1, the auxiliary beam L2 and the excited beam L3 pass through the polarizing rotation device 130, a light filtering effect of the beams is also achieved. Moreover, in some special embodiments, the polarizing rotation device 130 may be directly configured outside the projection lens 60, i.e. between the projection lens 60 and the external polarizer, which is not limited by the invention.

Figure 2B:
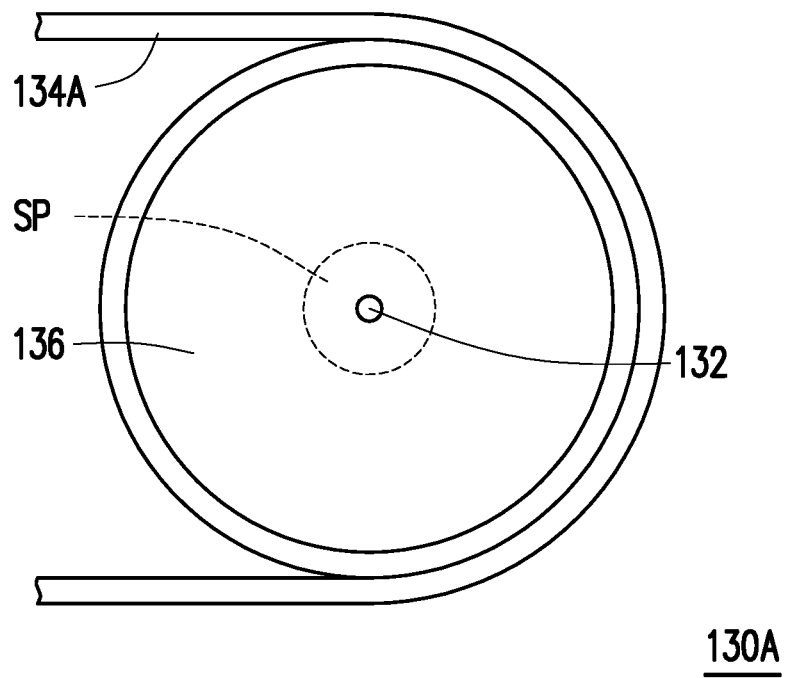

Referring to FIG. 1 and FIG. 2B, in another embodiment, a polarizing rotation device 130A may be adopted to replace the polarizing rotation device 130 of FIG. 2A, and a difference therebetween is that in the embodiment, the driving element 134A of the polarizing rotation device 130A is a driving assembly, for example, a belt, a chain or a gear set, etc. For example, when the driving element 134A is a gear set (not shown), an edge of the polarizing element is correspondingly provided with teeth for meshing with the gear set, so as to be rotated by the driving element 134A. Therefore, the excitation beam L1 provided by the excitation light source 110 is incident on a center portion of the polarizing element 136 to form a light spot SP, and then the excitation beam L1 may penetrate through the center portion of the polarizing element 136. In this way, a volume of the polarizing rotation device 130A may be reduced, though the invention is not limited thereto.

Figure 2C:
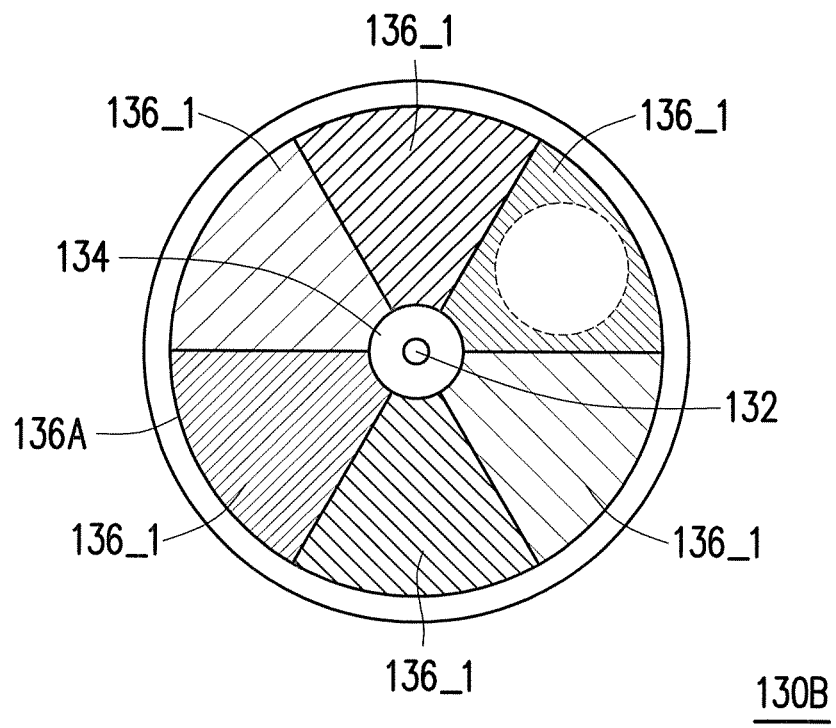

Referring to FIG. 1 and FIG. 2C, in another embodiment, a polarizing rotation device 130B may be adopted to replace the polarizing rotation device 130 of FIG. 2A, and a difference therebetween is that in the embodiment, a polarizing element 136A includes a plurality of polarizing subregions 136_1, and the polarizing subregions 136_1 have polarizing materials of different polarization directions. To be specific, in the embodiment, the polarizing element 136A is formed by arranging a plurality of polarizing materials of different polarization directions in a ring. Therefore, when the polarizing element 136 is rotated, the excitation beam L1 sequentially passes through the polarizing subregions 136_1 of the polarizing element 136A, and the excitation beam L1 passing through the polarizing subregions 136_1 of the polarizing element 136A has different polarization states at different time, and variation of the polarization states is not continuous. Therefore, in the implementation pattern of combination with the filter device 180 (i.e. the embodiment that the polarizing rotation device is located at the position C, as shown in FIG. 1), the different polarization states of various colors of light subjected to the filtering function are more uniform, so as to further enhance imaging and brightness uniformity of the 3D display image.

Figure 2D:
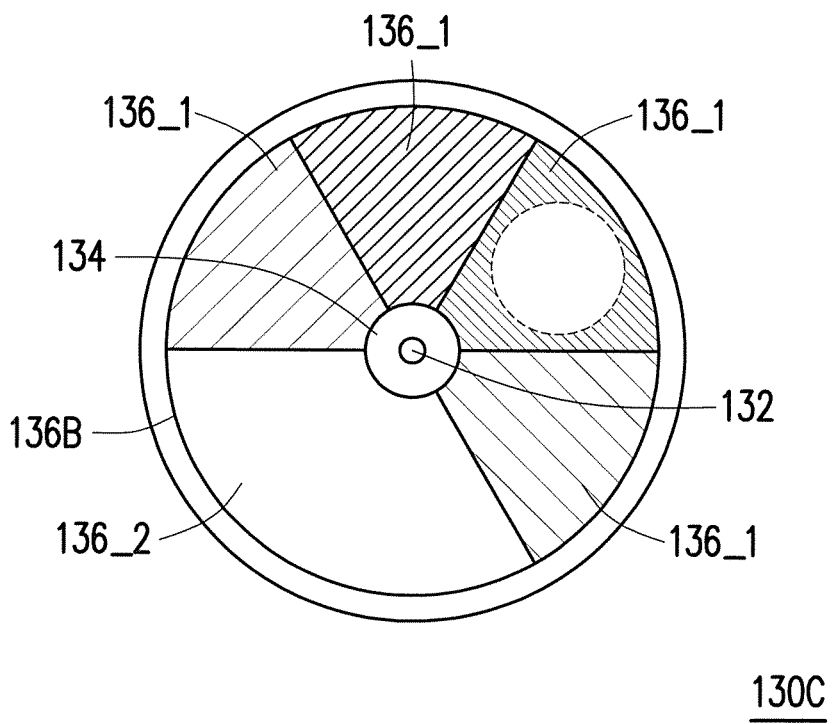
Figure 2E:
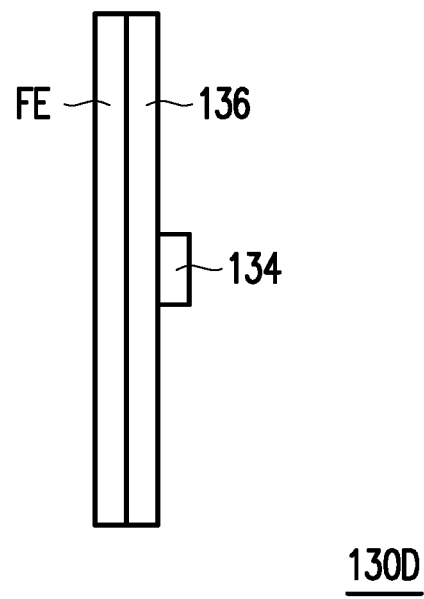
FIG. 2E and FIG. 2F are schematic side views of polarizing rotation devices combined with a filter device according to different embodiments of the invention.
Figure 2F:
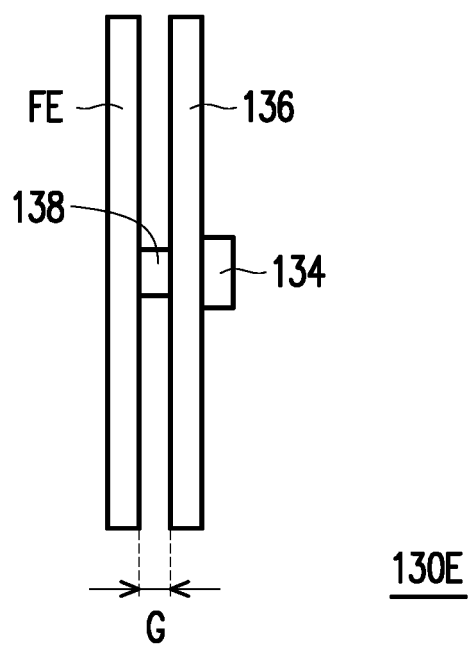

Referring to FIG. 1 and FIG. 2D, in another embodiment, a polarizing rotation device 130C may be adopted to replace the polarizing rotation device 130 of FIG. 2A, and a difference therebetween is that in the embodiment, a polarizing element 136B further includes at least one transparent region 136_2, which is pervious to the excited beam L3. In the embodiment, the transparent region 136_2, for example, corresponds to a green or yellow light filter. Therefore, when the polarizing element 136B is rotated, the excitation beam L1 sequentially passes through the polarizing subregions 136_1 of the polarizing element 136B, and the excitation beam L1 passing through the polarizing element 136B has discontinuous and different polarization directions and intensity at different time, and the excited beam L3 may directly pass through the transparent region 136_2 of the polarizing element 136B and the filter for being converted into green light or yellow light without passing through a polarizing material. In this way, in the implementation pattern of combination with the filter device 180 (i.e. the embodiment that the polarizing rotation device is located at the position C, as shown in FIG. 1), the different polarization states of various colors of light subjected to the filtering function are more uniform, and loss of brightness of green light or yellow light is avoided, so as to further increase lighting intensity of the yellow light or green light to enhance the imaging and brightness uniformity of the 3D display image.

Referring to FIG. 1 and FIG. 2E, in the embodiment shown in FIG. 1 that the polarizing rotation device 130 is located at the position C, i.e., the embodiment that the polarizing rotation device 130 of FIG. 1 is combined with the filter device 180, a manner in which the polarizing rotation device 130 and the filter device 180 are integrated into a single rotation device may be understood by reference to a polarizing rotation device 130D of FIG. 2E. In the embodiment, the polarizing rotation device 130D may further include the filter element FE. Configuration positions of the filter element FE and the polarizing element 136 are coincided, and the filter element FE is fixed to the polarizing element 136 by glue or a mechanical member. For example, the filter element FE and the polarizing element 136 may be attached together by glue or other suitable adhesion means, or the filter element FE and the polarizing element 136 may be locked or fastened together by a screw, a fastener or other suitable mechanical member. Therefore, the filter element FE and the polarizing element 136 may achieve a rotation effect through the same driving element 134, and the light filtering effect can be achieved at the same time when the excitation beam L1, the auxiliary beam L2 and the excited beam L3 pass through the polarizing rotation device 130D. Here, FIG. 2E depicts an example in which the filter element FE is located on a light entering side. However, in other embodiments, it may be the polarizing element 136 that is located on the light entering side.

Referring to FIG. 1 and FIG. 2F, in another embodiment, a polarizing rotation device 130E may be adopted to replace the polarizing rotation device 130D of FIG. 2E, and a difference therebetween is that in the embodiment, the filter element FE of the polarizing rotation device 130E is connected to the polarizing element 136 via a spacer 138 and is kept spaced from the polarizing element by a distance G. In addition, the spacer 138 is, for example, disposed on a rotation central axis of the polarizing rotation device 130E. However, in other embodiments, the polarizing element 136 and the filter element FE may be combined in other manners, and the invention is not limited thereto.

Figure 3:
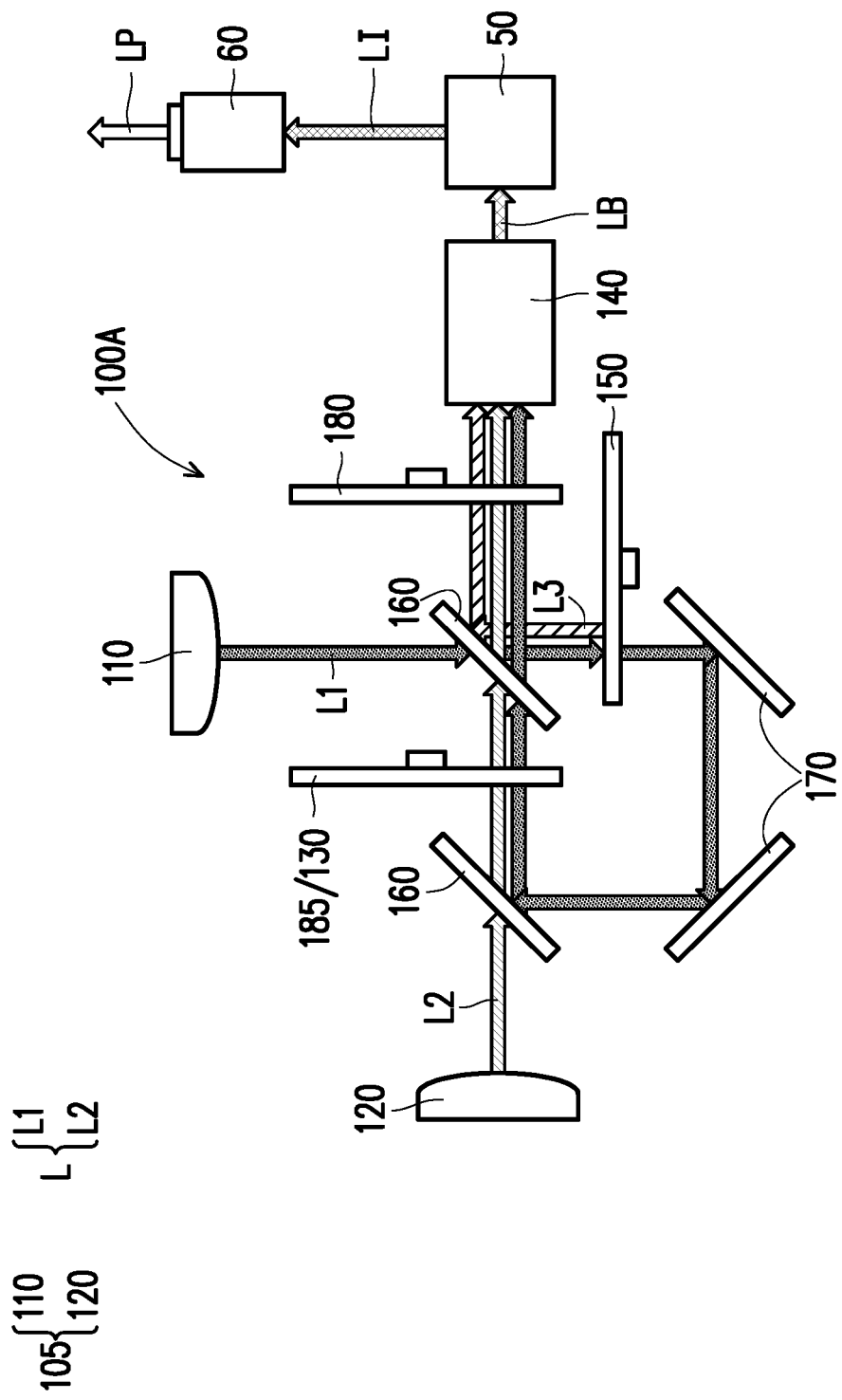
FIG. 3 is a schematic diagram of a projection device according to another embodiment of the invention.
Figure 4A:
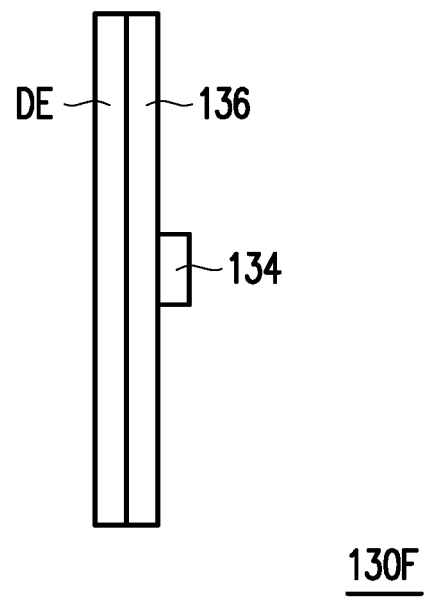
FIG. 4A to FIG. 4C are schematic side views of polarizing rotation devices combined with a diffusing device according to different embodiments of the invention.
Figure 4B:
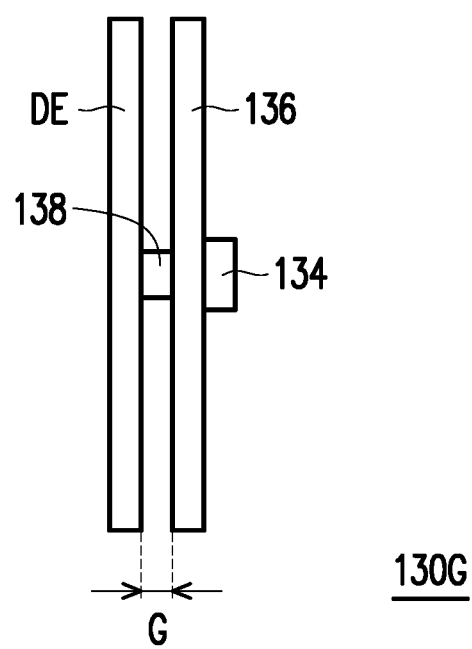
Figure 4C:
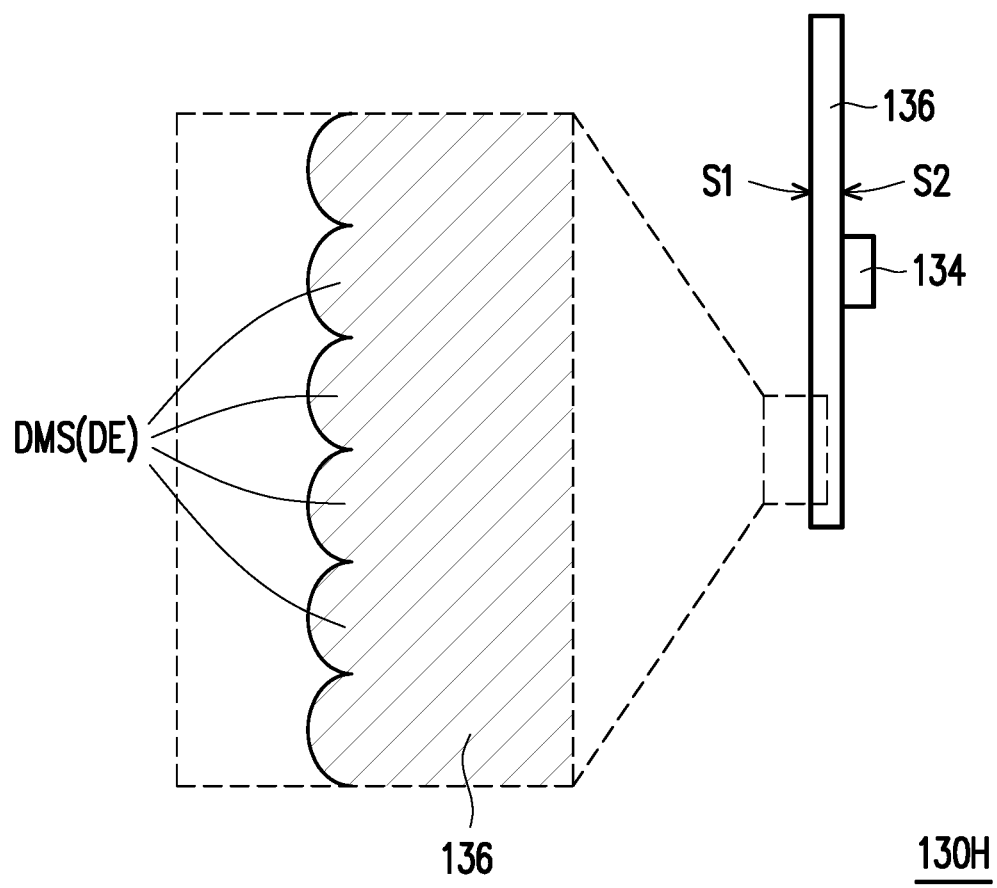

It is worth mentioning that, by combining the polarizing rotation device 130 with the filter device 180 to obtain a single rotation device, mechanism design can be simplified, and thus flexibility in space utilization can be improved and cost can be reduced. In addition, the filter element FE and the polarizing element 136 can share the same driving element 134, and noise sources can therefore be decreased. FIG. 3 is a schematic diagram of a projection device according to another embodiment of the invention. FIG. 4A to FIG. 4C are schematic side views of polarizing rotation devices combined with a diffusing device according to different embodiments of the invention. Referring first to FIG. 3, a projection device 20 of the embodiment is similar to the projection device 10 of FIG. 1, and a difference therebetween is that in the embodiment, an illumination system 100A of the projection device 20 further includes a diffusing device 185. The diffusing device 185 is disposed on a transmission path of the excitation beam L1 and the auxiliary beam L2, and is configured to let the passing excitation beam L1 or auxiliary beam L2 have a diffusing effect, so as to reduce or remove laser speckles of the excitation beam L1 or the auxiliary beam L2.

In the projection device 20 of the embodiment, the polarizing rotation device 130 may further include a diffusing element (for example, a diffusing element DE shown in FIG. 4A to FIG. 4C, which will be described later in detail), where configuration positions of the diffusing element and the polarizing element are coincided. In other words, the polarizing rotation device 130 of the embodiment of FIG. 3 is combined with the diffusing device 185 to obtain a single rotation device. In this way, the excitation beam L1 and the auxiliary beam L2 may pass therethrough, so as to uniform the energy of the excitation beam L1 and the auxiliary beam L2 and to achieve the diffusing effect at the same time, and a good display effect is achieved. However, in other embodiments, the polarizing rotation device 130 and the diffusing device 185 may be two independent members.

Since the polarizing rotation device 130 may not be disposed on the transmission path of the excited beam L3, the excited beam L3 does not pass through the polarizing element 136 and avoids loss of brightness, and better light efficiency can be achieved.

Referring to FIG. 3 and FIG. 4A, a manner in which the polarizing rotation device 130 and the diffusing device 185 are integrated into a single rotation device may be understood by reference to a polarizing rotation device 130F of FIG. 4A. In the embodiment, the polarizing rotation device 130F may further include the diffusing element DE. Configuration positions of the diffusing element DE and the polarizing element 136 are coincided, and the diffusing element DE is fixed to the polarizing element 136 by glue or a mechanical member. For example, the diffusing element DE and the polarizing element 136 may be attached together by glue or other suitable adhesion means, or the diffusing element DE and the polarizing element 136 may be locked or fastened together by a screw, a fastener or other suitable mechanical member. Therefore, the diffusing element DE and the polarizing element 136 may achieve the rotation effect through the same driving element 134, and the diffusing effect can be achieved at the same time when the excitation beam L1 and the auxiliary beam L2 pass through the polarizing rotation device 130F. Here, FIG. 4A depicts an example in which the diffusing element DE is located on the light entering side. However, in other embodiments, it may be the polarizing element 136 that is located on the light entering side.

Referring to FIG. 3 and FIG. 4B, in another embodiment, a polarizing rotation device 130G may be adopted to replace the polarizing rotation device 130F of FIG. 4A, and a difference therebetween is that in the embodiment, the diffusing element DE of the polarizing rotation device 130G is connected to the polarizing element 136 via the spacer 138 and is kept spaced from the polarizing element by the distance G. In addition, the spacer 138 is, for example, disposed on a rotation central axis of the polarizing rotation device 130F.

Referring to FIG. 3 and FIG. 4C, in another embodiment, a polarizing rotation device 130H may be adopted to replace the polarizing rotation device 130F of FIG. 4A, and a difference therebetween is that in the embodiment, the diffusing element DE of the polarizing rotation device 130H is a diffusing microstructure DMS, wherein the polarizing element 136, for example, has a surface S1 and a surface S2 opposite each other, and the diffusing microstructure DMS is located on at least one surface of the polarizing element 136. The diffusing microstructure DMS of FIG. 4C is located on the surface S1 of the polarizing element 136 for illustrative purposes, and the diffusing microstructure DMS may also be located on the surface S2 of the polarizing element 136 or on both the surface S1 and the surface S2 of the polarizing element 136. However, in other embodiments, the polarizing element 136 and the diffusing element DE may be combined in other manners, and the invention is not limited thereto.

It is worth mentioning that, by combining the polarizing rotation device 130 with the diffusing device 185 to obtain a single rotation device, mechanism design can be simplified, and thus flexibility in space utilization can be improved and cost can be reduced. In addition, the diffusing element DE and the polarizing element 136 can share the same driving element 134, and noise sources can therefore be decreased.

In the embodiment, the number of the light valve 50 is one. For example, the projection device 20 uses a single DMD (1-DMD). In other embodiments, the number of the light valve 50 may be two. For example, a projection device uses two DMDs (2-DMD), and the illumination system 100A may have no filter device 180.

Figure 5:
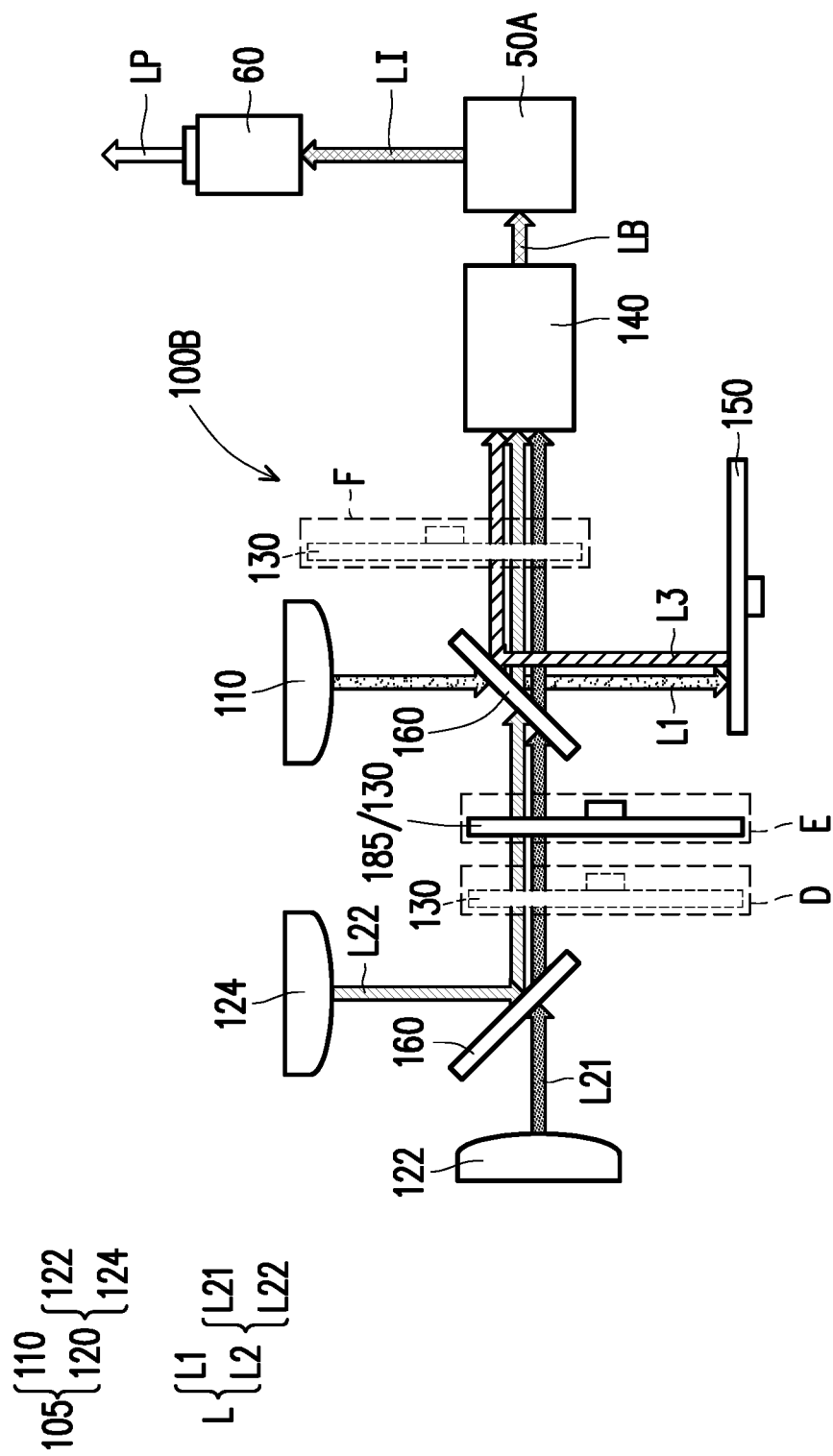
FIG. 5 is a schematic diagram of a projection device according to another embodiment of the invention.

FIG. 5 is a schematic diagram of a projection device according to another embodiment of the invention. Referring to FIG. 5, a projection device 30 of the embodiment is similar to the projection device 10 of FIG. 1, and a difference therebetween is that in the embodiment, the number of a light valve 50A is three. For example, the projection device 30 uses three DMDs (3-DMD), and the wavelength conversion element 150 does not have a section for allowing the excitation beam L1 to penetrate therethrough. In the projection device 30, the auxiliary light source 120 further includes a first auxiliary light source 122 and a second auxiliary light source 124, and an illumination system 100B of the projection device 30 further includes the diffusing device 185. The diffusing device 185 is configured to let the passing excitation beam L1 or auxiliary beam L2 have the light filtering effect, so as to reduce or remove laser speckles of the excitation beam L1 or the auxiliary beam L2. In the embodiment, the first auxiliary light source 122 provides a first auxiliary beam L21, and the second auxiliary light source 124 provides a second auxiliary beam L22. To be specific, in the embodiment, the excitation light source 110 is a laser diode or a plurality of laser diodes adapted to emit blue laser light to provide a first blue beam (i.e. the excitation beam L), the first auxiliary light source 122 is a laser diode or a plurality of laser diodes adapted to emit red laser light or a light-emitting diode adapted to emit a red beam, so as to provide a red beam, and the second auxiliary light source 124 is a laser diode or a plurality of laser diodes adapted to emit blue laser light, or the second auxiliary light source 124 is a light-emitting diode or a plurality of LEDs adapted to emit a blue light, so as to provide a second blue beam, where the first blue beam is used for being excited to form the excited beam L3, the second blue beam is used for providing the blue light part of the illumination beam LB, and the first blue beam and the second blue beam have different peak wavelengths, though the invention is not limited thereto. In the embodiment, the first auxiliary light source 122 is the laser diode adapted to emit the red laser light, and the second auxiliary light source 124 is the laser diode adapted to emit the blue laser light. In addition, in some embodiments, the auxiliary light source 120 may have no first auxiliary light source 122, and the red light part of the illumination beam LB may be provided by the red light band of the excited beam L3.

In the embodiment, the at least one dichroic element 160 includes a DMB and a DMGO, where the DMB (the dichroic element 160) is located between the first auxiliary light source 122 and the DMGO (the dichroic element 160), and is configured to reflect the second auxiliary beam L22 (the second blue beam), and allow the first auxiliary beam L21 (the red beam) to pass through. The DMGO (the dichroic element 160) is located between the light uniforming element 140 and the DMB (another dichroic element 160), and is configured to reflect the excited beam L3 and allow the excitation beam L1 (the first blue beam), the first auxiliary beam L21 (the red beam) and the second auxiliary beam L22 (the second blue beam) to pass through, such that all of the required beams are converged and transmitted to the light uniforming element 140. In a different embodiment, configuration and type of the dichroic element 160 may be varied along with different types of the illumination system 100B, and the configuration pattern and type of the dichroic element 160 are not limited by the invention.

In the projection device 30 of the embodiment, the polarizing rotation device 130 may be selectively configured at one of a position D, a position E and a position F, as shown in FIG. 5, though the invention is not limited thereto. In detail, the polarizing rotation device 130 may be disposed between the auxiliary light source 120 and the wavelength conversion element 150, for example, at the position D shown in FIG. 5. In this way, the auxiliary beam L2 may pass through the polarizing rotation device 130, so as to uniform the energy of the auxiliary beam L2, and achieve a good display effect.

Alternatively, the polarizing rotation device 130 may also be disposed between the wavelength conversion element 150 and the light uniforming element 140, for example, at the position F shown in FIG. 5, so as to let the excitation beam L1, the auxiliary beam L2 and the excited beam L3 pass through. Alternatively, the polarizing rotation device 130 may further include a diffusing element (for example, the diffusing element DE shown in FIG. 4A to FIG. 4C; the related descriptions thereof can be found in the aforesaid embodiment and will not be repeated), where configuration positions of the diffusing element and the polarizing element are coincided. In other words, the polarizing rotation device 130 of the embodiment of FIG. 5 is combined with the diffusing device 185 to obtain a single rotation device at, for example, the position E shown in FIG. 5. Therefore, the auxiliary beam L2 (i.e. the first auxiliary beam L21 and the second auxiliary beam L22) may achieve the diffusing effect when passing through the polarizing rotation device 130.

When the polarizing rotation device 130 is disposed at the position D or the position E, since the polarizing rotation device 130 may not be disposed on the transmission path of the excited beam L3, the excited beam L3 does not pass through the polarizing element 136 and avoids loss of brightness, and better light efficiency can be achieved.

Figure 6:
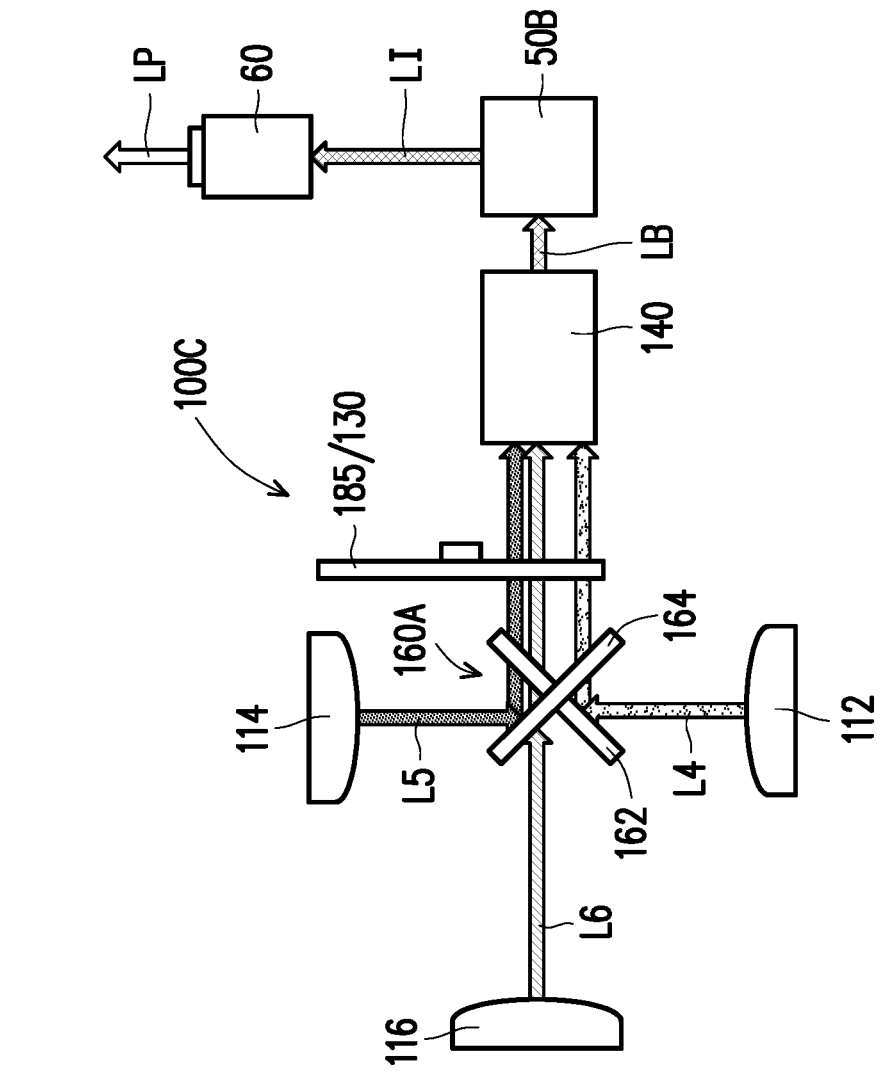
FIG. 6 is a schematic diagram of a projection device according to another embodiment of the invention.

FIG. 6 is a schematic diagram of a projection device according to another embodiment of the invention. Referring to FIG. 6, the number of a light valve 50B of a projection device 40 of the embodiment may be one, two or three. An illumination system 100C includes at least one light source 105, the polarizing rotation device 130 and the light uniforming element 140. In the embodiment, no wavelength conversion element is disposed in the illumination system 100C. The light source 105 of the illumination system 100C includes at least two light sources, and the at least two light sources are configured to provide at least two beams having different colors. As shown in FIG. 6, the light source 105 includes a light source 112, a light source 114 and a light source 116 for illustrative purposes. The light source 112 is configured to provide a beam L4, the light source 114 is configured to provide a beam L5, and the light source 116 is configured to provide a beam L6. To be specific, in the embodiment, the light source 112 is a laser diode or a plurality of laser diodes adapted to emit blue laser light to provide a blue beam (i.e. the beam L4), the light source 114 is a laser diode or a plurality of laser diodes adapted to emit red laser light to provide a red beam (i.e. the beam L5), and the light source 116 is a laser diode or a plurality of laser diodes adapted to emit green laser light to provide a green beam (i.e. the beam L6), wherein the blue beam (i.e. the beam L4), the red beam (i.e. the beam L5) and the green beam (i.e. the beam L6) are used for providing the blue light part, the red light part and the green light part, respectively, of the illumination beam LB, though the invention is not limited thereto.

In the embodiment, at least one dichroic element 160A includes a dichroic element 162 and a dichroic element 164. The dichroic element 162 and the dichroic element 164 are located between the light source 116 and the polarizing rotation device 130 and located between the light source 112 and the light source 114. The dichroic element 162 is, for example, a DMB, and the dichroic element 164 is, for example, a Dichroic Mirror with Red light reflect, wherein the DMB is configured to reflect the beam L4 (the blue beam) and is pervious to the beams L5 and L6 (the red beam and the green beam), and the Dichroic Mirror with Red light reflect is configured to reflect the beam L5 and is pervious to the beams L4 and L6, such that all of the required beams are converged and transmitted to the light uniforming element 140. In a different embodiment, configuration and type of the dichroic element 160A may be varied along with different types of the illumination system 100C, and the configuration pattern and type of the dichroic element 160A are not limited by the invention.

In the projection device 40 of the embodiment, the polarizing rotation device 130 may be disposed between the at least one dichroic element 160A and the light uniforming element 140. In this way, the beam L4, the beam L5 and the beam L6 may pass through the polarizing rotation device 130, so as to uniform the energy of the beam L4, the beam L5 and the beam L6, and achieve a good display effect.

In the embodiment, the polarizing rotation device 130 may further include a diffusing element (for example, the diffusing element DE shown in FIG. 4A to FIG. 4C; the related descriptions thereof can be found in the aforesaid embodiment and will not be repeated), where configuration positions of the diffusing element and the polarizing element are coincided. In other words, the polarizing rotation device 130 of the embodiment of FIG. 6 is combined with the diffusing device 185 to obtain a single rotation device. Therefore, the beam L4, the beam L5 and the beam L6 may achieve the diffusing effect when passing through the polarizing rotation device 130. However, in other embodiments, the polarizing rotation device 130 and the diffusing device 185 may be two independent members.

In summary, the embodiments of the invention have at least one of the following advantages or effects. In the polarizing rotation device or the projection device configured with the polarizing rotation device of the invention, the driving element is configured to drive the polarizing element to rotate sequentially while taking the rotation shaft as the rotation central axis. Therefore, the beam may penetrate through the polarizing element, and the beam penetrating through the polarizing element has different polarization states at different time. In this way, in the polarized stereoscopic mode (i.e. a polarizer is added to the outside of the projection lens) of the projection device, a color or brightness of the display image is uniform, so that a user may observe a 3D display image with better uniformity through polarized stereoscopic glasses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A polarizing rotation device, comprising:
a rotation shaft;
a driving element, configured to drive the rotation shaft to rotate;
a polarizing element, connected to the rotation shaft and disposed on a transmission path of at least one beam, the polarizing element comprising a plurality of polarizing subregions that have polarizing materials of different polarization directions; and
a diffusing element, fixed to the polarizing element and coincided with the polarizing element, wherein the driving element is configured to simultaneously drive the polarizing element and the diffusing element to rotate sequentially while taking the rotation shaft as a rotation central axis, and when the polarizing element is rotated, the at least one beam sequentially and only once penetrates through the diffusing element and the polarizing element such that the at least one beam penetrating through the polarizing element has different polarization states at different time, and variation of the polarization states is not continuous.

2. The polarizing rotation device as claimed in claim 1, wherein the polarizing element further comprises at least one transparent region that is pervious to one of the at least one beam.

3. The polarizing rotation device as claimed in claim 1, wherein the driving element is a motor, and is connected to the rotation shaft, and the at least one beam penetrates through a non-center portion of the polarizing element.

4. The polarizing rotation device as claimed in claim 1, wherein the driving element is a driving assembly, and the at least one beam penetrates through a center portion of the polarizing element.

5. The polarizing rotation device as claimed in claim 1, wherein the polarizing rotation device further comprises a filter element disposed on the polarizing element and coincided with the polarizing element.

6. The polarizing rotation device as claimed in claim 1, wherein the diffusing element is fixed to the polarizing element by glue or a mechanical member.

7. The polarizing rotation device as claimed in claim 1, wherein the diffusing element is connected to the polarizing element via a spacer and is kept spaced from the polarizing element by a distance.

8. The polarizing rotation device as claimed in claim 1, wherein the diffusing element is a diffusing microstructure, wherein the diffusing microstructure is located on at least one surface of the polarizing element.

9. A projection device, comprising:
an illumination system, configured to provide an illumination beam, and the illumination system comprising:
at least one excitation light source, configured to provide at least one excitation beam;
a polarizing rotation device, comprising a rotation shaft, a driving element, a polarizing element and a diffusing element, wherein the driving element is configured to drive the rotation shaft to rotate, the polarizing element is connected to the rotation shaft and is disposed on a transmission path of the at least one excitation beam, the polarizing element comprises a plurality of polarizing subregions, the polarizing subregions have polarizing materials of different polarization directions, and the diffusing element is fixed to the polarizing element and coincided with the polarizing element; and
a light uniforming element, being pervious to a part of the at least one excitation beam to form the illumination beam;
at least one light valve, disposed on a transmission path of the illumination beam, and configured to convert the illumination beam into an image beam; and
a projection lens, disposed on a transmission path of the image beam, and configured to convert the image beam into a projection beam, wherein the driving element is configured to simultaneously drive the polarizing element and the diffusing element to rotate sequentially while taking the rotation shaft as a rotation central axis, when the polarizing element is rotated, the at least one excitation beam sequentially and only once penetrates through the diffusing element and the polarizing element such that the at least one excitation beam penetrating through the polarizing element has different polarization states at different time, and variation of the polarization states is not continuous.

10. The projection device as claimed in claim 9, wherein the polarizing element further comprises at least one transparent region that is pervious to at least one excited beam, wherein the at least one excited beam is converted from the at least one excitation beam.

11. The projection device as claimed in claim 9, wherein the driving element is a motor, and is connected to the rotation shaft, and the at least one excitation beam penetrates through a non-center portion of the polarizing element.

12. The projection device as claimed in claim 9, wherein the driving element is a driving assembly, and the at least one excitation beam penetrates through a center portion of the polarizing element.

13. The projection device as claimed in claim 9, wherein the illumination system further comprises a wavelength conversion element disposed on the transmission path of the at least one excitation beam, and located between the at least one excitation light source and the light uniforming element.

14. The projection device as claimed in claim 9, wherein the illumination system further comprises a filter device disposed between the at least one excitation light source and the light uniforming element.

15. A projection device, comprising:
an illumination system, configured to provide an illumination beam, and comprising:
a light source, comprising at least one excitation light source and at least one auxiliary light source, wherein the at least one excitation light source is configured to provide at least one excitation beam, and the at least one auxiliary light source is configured to provide at least one auxiliary beam;
a polarizing rotation device, comprising a rotation shaft, a driving element and a polarizing element, wherein the driving element is configured to drive the rotation shaft to rotate, and the polarizing element is connected to the rotation shaft and is disposed on a transmission path of the at least one auxiliary beam; and
a light uniforming element, being pervious to a part of the at least one excitation beam and the at least one auxiliary beam to form the illumination beam;
at least one light valve, disposed on a transmission path of the illumination beam, and configured to convert the illumination beam into an image beam; and
a projection lens, disposed on a transmission path of the image beam, and configured to convert the image beam into a projection beam, wherein the driving element is configured to drive the polarizing element to rotate sequentially while taking the rotation shaft as a rotation central axis, when the polarizing element is rotated, the at least one auxiliary beam penetrates through the polarizing element, and the at least one auxiliary beam penetrating through the polarizing element has different polarization states at different time.

16. The projection device as claimed in claim 15, wherein the polarizing rotation device further comprises a diffusing element disposed on the polarizing element and coincided with the polarizing element.

17. The projection device as claimed in claim 16, wherein the diffusing element is fixed to the polarizing element by glue or a mechanical member.

18. The projection device as claimed in claim 16, wherein the diffusing element is connected to the polarizing element via a spacer and is kept spaced from the polarizing element by a distance.

19. The projection device as claimed in claim 16, wherein the diffusing element is a diffusing microstructure, wherein the diffusing microstructure is located on at least one surface of the polarizing element.

20. A projection device, comprising:
an illumination system, configured to provide an illumination beam, and the illumination system comprising:
at least two light sources, configured to provide at least two beams; and
a polarizing rotation device, comprising a rotation shaft, a driving element and a polarizing element, wherein the driving element is configured to drive the rotation shaft to rotate, the polarizing element is connected to the rotation shaft and is disposed on a transmission path of the at least two beams;
at least one light valve, disposed on a transmission path of the illumination beam, and configured to convert the illumination beam into an image beam; and
a projection lens, disposed on a transmission path of the image beam, and configured to convert the image beam into a projection beam, wherein the driving element is configured to drive the polarizing element to rotate sequentially while taking the rotation shaft as a rotation central axis, when the polarizing element is rotated, the at least two beams penetrate through the polarizing element, the at least two beams penetrating through the polarizing element have different polarization states at different time, and the at least two beams penetrating through the polarizing element form the illumination beam.

21. The projection device as claimed in claim 20, wherein the polarizing rotation device further comprises a diffusing element disposed on the polarizing element and coincided with the polarizing element.

22. The projection device as claimed in claim 21, wherein the diffusing element is fixed to the polarizing element by glue or a mechanical member.

23. The projection device as claimed in claim 21, wherein the diffusing element is connected to the polarizing element via a spacer and is kept spaced from the polarizing element by a distance.

24. The projection device as claimed in claim 21, wherein the diffusing element is a diffusing microstructure, wherein the diffusing microstructure is located on at least one surface of the polarizing element.

25. A projection device, comprising:
an illumination system, configured to provide an illumination beam, and the illumination system comprising:
at least one excitation light source, configured to provide at least one excitation beam;
a polarizing rotation device, comprising a rotation shaft, a driving element and a polarizing element, wherein the driving element is configured to drive the rotation shaft to rotate, the polarizing element is connected to the rotation shaft;
a light uniforming element, being pervious to a part of the at least one excitation beam to form the illumination beam;
a wavelength conversion element disposed on a transmission path of the at least one excitation beam, and located between the at least one excitation light source and the light uniforming element, wherein the wavelength conversion element converts the at least one excitation beam into an excited beam, and the polarizing rotation device is not disposed on a transmission path of the excited beam; and at least one dichroic element, disposed between the at least one excitation light source and the wavelength conversion element for guiding the at least one excitation beam emitted from the at least one excitation light source to the wavelength conversion element, and the polarizing rotation device is located on the transmission path of the at least one excitation beam passing through the wavelength conversion element;

at least one light valve, disposed on a transmission path of the illumination beam, and configured to convert the illumination beam into an image beam; and a projection lens, disposed on a transmission path of the image beam, and configured to convert the image beam into a projection beam, wherein the driving element is configured to drive the polarizing element to rotate sequentially while taking the rotation shaft as a rotation central axis, when the polarizing element is rotated, the at least one excitation beam penetrates through the polarizing element, the at least one excitation beam penetrating through the polarizing element has different polarization states at different time, and the at least one dichroic element guides the excited beam reflected by the wavelength conversion element and the at least one excitation beam penetrating through the polarizing rotation device to the light uniforming element.

\* \* \* \* \*